United States Patent
Egawa et al.

(10) Patent No.: US 7,566,844 B2
(45) Date of Patent: Jul. 28, 2009

(54) LASER-MACHINING DEVICE

(75) Inventors: Akira Egawa, Gotenba (JP); Kazuhiro Suzuki, Yamanashi (JP); Hiroaki Tokito, Yamanashi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 727 days.

(21) Appl. No.: 11/247,258

(22) Filed: Oct. 12, 2005

(65) Prior Publication Data

US 2006/0081575 A1    Apr. 20, 2006

(30) Foreign Application Priority Data

Oct. 14, 2004    (JP) .............................. 2004-300457

(51) Int. Cl.
*B23K 26/00*    (2006.01)
*B23K 26/08*    (2006.01)

(52) U.S. Cl. .............................. 219/121.84; 219/121.78

(58) Field of Classification Search .. 219/121.6–121.86
See application file for complete search history.

(56) References Cited

U.S. PATENT DOCUMENTS

| | | | |
|---|---|---|---|
| 5,718,832 A | 2/1998 | Mori | |
| 6,100,498 A | 8/2000 | Nakata | |
| 2003/0183608 A1* | 10/2003 | Yamazaki et al. | ...... 219/121.83 |
| 2003/0192865 A1 | 10/2003 | Cole et al. | |

FOREIGN PATENT DOCUMENTS

| | | |
|---|---|---|
| JP | 1-218780 | 8/1989 |
| JP | 1-218780 A | 8/1989 |
| JP | 3-490 | 1/1991 |
| JP | 8-206862 | 8/1996 |

OTHER PUBLICATIONS

Japanese Notice of Reasons for Rejection mailed Mar. 4, 2008 issued in Japanese Application No. 2004-300457 (including a partial translation thereof).

\* cited by examiner

*Primary Examiner*—Sang Y Paik
(74) *Attorney, Agent, or Firm*—Drinker Biddle & Reath LLP

(57) ABSTRACT

A laser-machining device (1) for machining a workpiece (W) by radiating it with the laser beam output from a nozzle (42) of a laser oscillator (31) is disclosed. A gap amount sensor (43) detects the gap amount between the workpiece and the nozzle. An approach unit (12, 41) causes the nozzle to approach the workpiece to a position suitable for the laser machining. The approach unit performs a first approach operation (12a) for making the nozzle approach the workpiece using the gap amount detected by the gap amount sensor until the gap amount comes to assume a predetermined value, and a second approach operation (12b), after the first approach operation, for causing the nozzle to approach the workpiece until the complete approach without using the gap amount detected by the gap amount sensor. As a result, the required time is shorter and a stable piercing process can be executed.

3 Claims, 3 Drawing Sheets

LASER-MACHINING DEVICE

BACKGROUND OF THE INVENTION

1. Field of the Invention

This invention relates to a laser-machining device used for piercing a hole in a workpiece.

2. Description of the Related Art

In a general laser-machining device such as the one disclosed in Japanese Unexamined Patent Publication No. 1-218780, a gap sensor for detecting the distance (hereinafter referred to as "the gap amount") between the tip of a nozzle for radiating the laser and a workpiece to be machined by laser is arranged in the neighborhood of the tip of the nozzle. When starting to cut the workpiece by the laser-machining device, the nozzle approaches the workpiece based on the gap amount detected by the gap sensor. Then, when the nozzle reaches the desired position, the laser is radiated to pierce a hole, and after piercing a hole, the cutting process is started. In order to maintain the gap amount constant between the tip of the nozzle and the workpiece surface, even during the cutting process, the gap amount is continuously controlled using the gap sensor.

During the piercing process before the cutting process, a plasma may be generated on the surface of the workpiece, so that the gap sensor cannot operate normally, and the operation of the gap control axis may become unstable. In order to avoid this inconvenience, the gap control operation using the gap sensor may be temporarily canceled during the piercing process.

Specifically, in the general laser-machining device described in Japanese Unexamined Patent Publication No. 1-218780, the steps of (1) starting the approach operation of the gap control axis, (2) completing the approach operation, (3) canceling the gap control operation, (4) executing the piercing instruction, (5) resuming the gap control operation, and (6) starting to execute the cutting instruction, are executed in that order. In this way, in the general laser-machining device, the piercing process is executed after the nozzle approaches the position suitable for the piercing process and after completion of the piercing process, the cutting process is started.

In the general laser-machining device disclosed in Japanese Unexamined Patent Publication No. 1-218780, however, the piercing process is executed after the nozzle approach is complete as described above. In other words, with the general laser-machining device, there is the problem that it is required to wait for the completion of nozzle approach and therefore the machining time is increased.

Also, the gap control operation is temporarily canceled during the piercing process. Unless the gap control operation is canceled in this way, the operation of the gap sensor becomes unstable due to the effect of a plasma generated during the piercing process, which in turn makes the gap control operation unstable, thereby making it impossible to execute the piercing process successfully. The gap control operation is canceled to avoid this inconvenience. The cancellation of the gap control operation also consumes some time, and causes an increase in the machining-time.

This invention has been achieved in view of this situation, and the object thereof is to provide a laser-machining device capable of executing the piercing process stably and of reducing the required time.

SUMMARY OF THE INVENTION

In order to achieve the object described above, according to a first aspect of the invention, there is provided a laser-machining device, for machining a workpiece by radiating the workpiece with the laser beam output from the nozzle of a laser oscillator, comprising a gap amount sensor for detecting the gap amount between the workpiece and the nozzle, and an approaching means for causing the nozzle to approach the workpiece to a position suitable for laser machining, wherein in the case where the nozzle reaches a predetermined position before completion of the approach operation by the approaching means, the laser beam is radiated onto the workpiece, to machine it, while continuing the approach operation. In other words, the laser machining is started during the nozzle approach and, therefore, the machining time is shortened as compared with the case in which the laser beam machining is started after completion of the nozzle approach.

According to a second aspect of the invention, there is provided a laser-machining device of the first aspect, wherein the approaching means performs a first approach operation in which the nozzle continues to approach the workpiece using the gap amount detected by the gap amount sensor until the gap amount reaches a predetermined value, and a second approach operation in which the nozzle continues to approach the workpiece until the completion of the approach, without using the gap amount detected by the gap amount sensor, after the first approach operation.

There is a possibility that the detected gap amount becomes unstable under the effect of the plasma in the second approach operation after the first approach operation. However, in the second aspect, as the actual gap amount is not used in the second approach operation, the nozzle can approach the workpiece accurately and stably. Further, in the second aspect of the invention, the first and/or the second approach operation is not temporarily canceled and, therefore, the cancellation time is reduced to shorten the machining time as a whole.

According to a third aspect of the invention, there is provided a laser-machining device of the second aspect, wherein an approach rate of the nozzle is calculated in the first approach operation based on the gap amount detected by the gap amount sensor, and wherein the approach rate of the nozzle is calculated in the second approach operation by simulating the gap amount on the assumption that the predetermined value is equal to the gap amount between the workpiece and the nozzle immediately before the end of the first approach operation and that the average value of the nozzle approach rate is equal to the half value of the approach rate immediately before the end of the first approach operation.

Specifically, in the third aspect of the invention, the gap amount and the approach rate are calculated by simulation and, therefore, the gap amount and the approach rate can be determined with comparative accuracy.

According to a fourth aspect of the invention, there is provided a laser-machining device, of the second or third aspect of the invention, further comprising a means for adjusting the approach rate by assigning weights to the simulated gap amount using a signal or a set value.

Specifically, in the fourth aspect, the simulated gap amount is assigned weights and therefore a more appropriate approach rate can be calculated by simulation.

The various aspects described above share the advantage that the required time is shortened and a stable piercing process can be executed.

Further, the first aspect of the invention has the advantage that the machining time is shortened as compared with a case in which the laser machining is started after completion of the nozzle approach.

Furthermore, the third aspect of the invention has the advantage that the gap amount and the approach rate can be determined with comparative accuracy.

In addition, the fourth aspect of the invention has the advantage that the approach rate of a more appropriate value can be calculated by simulation.

These and other objects, features and advantages of the present invention will be more apparent in light of the detailed description of exemplary embodiments thereof as illustrated by the drawings.

DETAILED DESCRIPTION OF THE INVENTION

Figure 1:
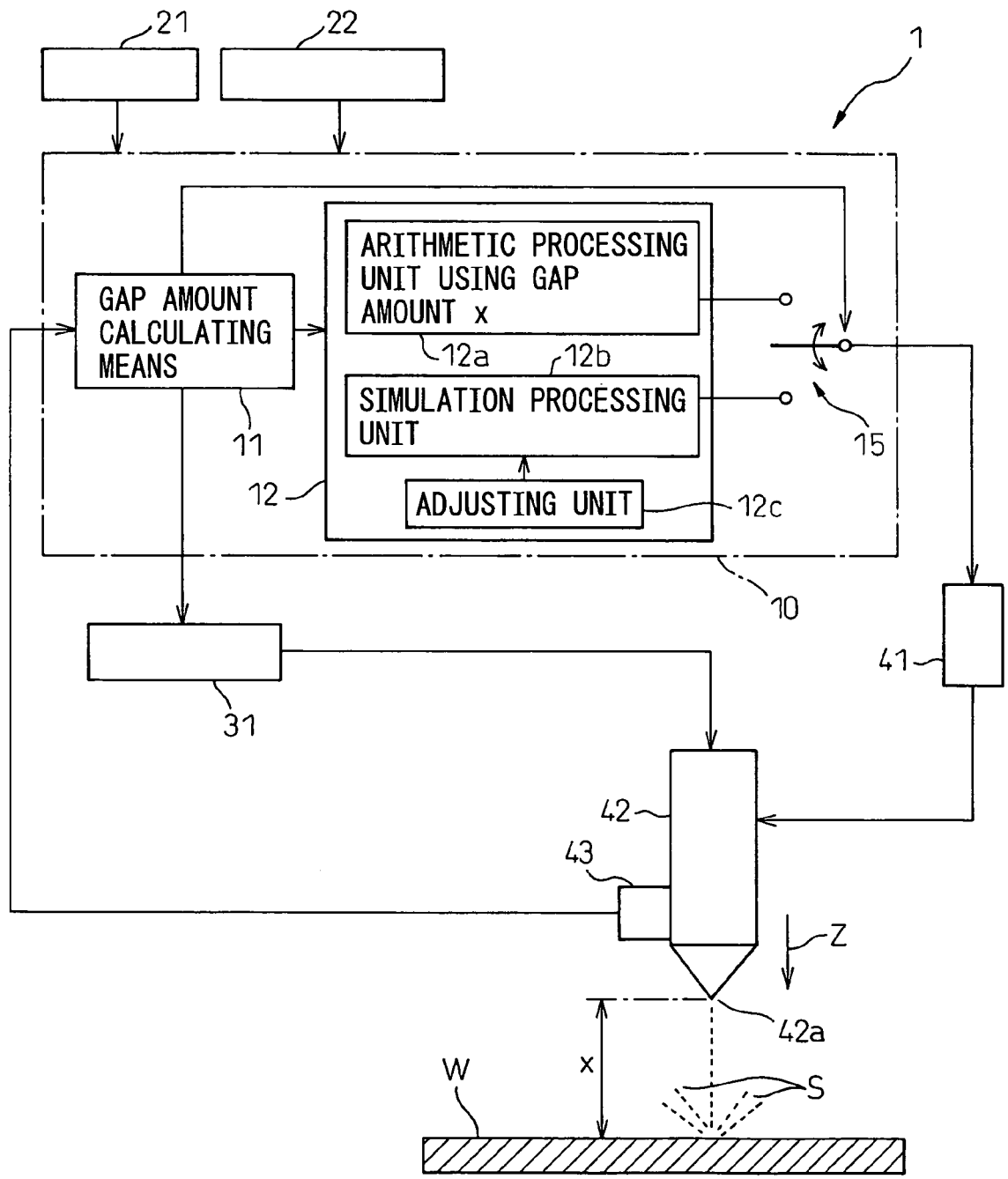
FIG. 1 is a block diagram showing a laser beam machining according to this invention.

Embodiments of the invention are described below with reference to the accompanying drawings. In the drawings, the same component members are designated by the same reference numerals. To facilitate understanding, these drawings are shown in appropriate scales.

FIG. 1 is a block diagram showing a laser-machining device according to this invention. As shown in FIG. 1, the laser-machining device 1 includes a computer numerical control (CNC) 10 for controlling the laser-machining device 1. As shown, the CNC 10 is connected with a display unit 21 such as a CRT or a liquid crystal display, which displays the position and the moving rate of the nozzle 42, the laser output state and the machining conditions described later. Also, the CNC 10 is connected with an input unit 22 such as a keyboard and a mouse, which is used by the operator to input command values, various data and parameters for the laser-machining device.

The laser-machining device 1 further includes a laser oscillator 31 connected to the CNC 10. The laser oscillator 31 is also connected to a nozzle 42, and the laser beam oscillated and amplified by the laser oscillator is radiated from the nozzle 42. Further, as shown, the nozzle 42 has a gap sensor 43. The gap sensor 43 detects, in non-contact fashion, the distance, i.e. the gap amount x between the tip or forward end 42a of the nozzle 42 and the workpiece W to be machined by laser and thus functions to supply the gap amount to a gap amount calculating means 11 of the CNC 10. The CNC 10 is also connected with a motor 41 used to operate the lift shaft (not shown) in the direction of arrow Z for vertically moving the nozzle 42 together with the gap sensor 43. The lift shaft extends in the longitudinal direction of the nozzle 42. In FIG. 1, a plasma s is generated by radiating the laser beam from the nozzle 42 on the workpiece W.

As shown in FIG. 1, the CNC 10 of the laser-machining device 1 includes a gap amount calculating means 11 for calculating the gap amount x in accordance with the output value of the gap sensor 43, and a gap control rate calculating means 12 for calculating the rate of approach of the nozzle 42 in Z direction, i.e. the gap control rate v. As can be understood from FIG. 1, the gap control rate calculating means 12 includes an arithmetic processing unit 12a for calculating the gap control rate v based on the gap amount x and a simulation processing unit 12b for calculating the gap control rate v by simulation without using the gap amount x. One of the arithmetic processing unit 12a and the simulation processing unit 12b is selected in accordance with the gap amount x by a switch 15 of the CNC 10. The specific operation of the arithmetic processing unit 12a and the simulation processing unit 12b is described later. Further, as shown, the gap control rate calculating means 12 is connected through the switch 15 to a motor 41, which is driven based on the gap control rate v calculated by the gap control rate calculating means 12.

Figure 2:
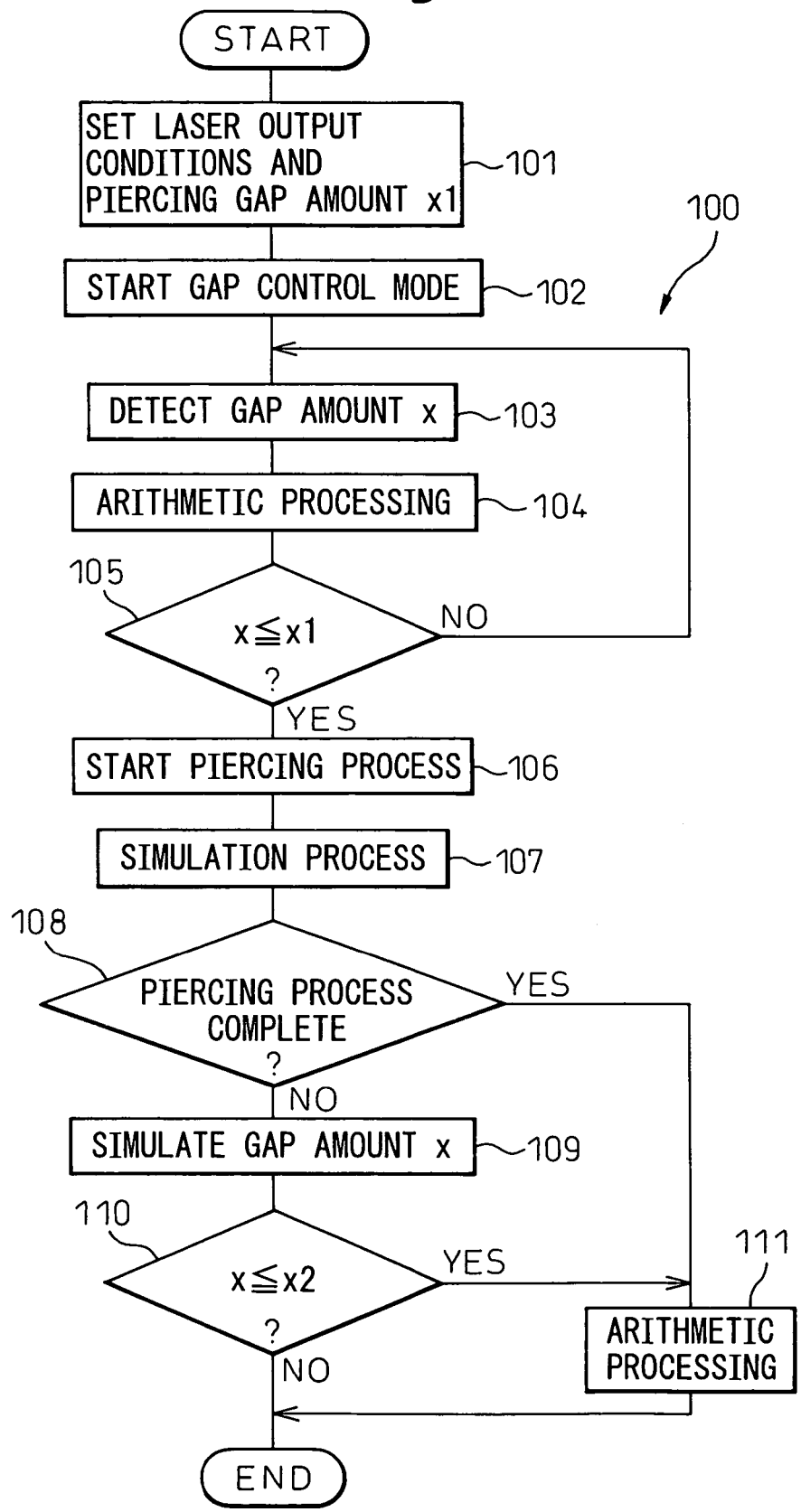
FIG. 2 is a flowchart for explaining the process in which the laser-machining device according to the invention outputs the laser during the nozzle approach.

FIG. 2 is a flowchart for explaining the operation in which the nozzle of the laser-machining device according to the invention outputs the laser while approaching the workpiece. A program 100 for executing the process of the flowchart shown in FIG. 2 is stored in a storage unit (not shown) such as a ROM or a RAM of the CNC 10. At step 101 of the program 100 shown in FIG. 2, the laser output conditions for the piercing process and the piercing gap amount x1 for starting the piercing process are set. Then, at step 102, the gap control mode is started by a program command. As a result, the nozzle 42 of the laser-machining device 1 is made to approach the workpiece W held on a holding table or the like. The gap control rate calculating means 12 of the CNC 10 and the motor 41 function as an approaching means for making the nozzle 42 approach to the workpiece.

The gap amount x is detected by the gap sensor 43 at step 103 and, at the same time, the gap control mode is started at step 102. The operation of the gap sensor 43 to detect the gap amount x is assumed to be performed constantly as required. Further, at the same time that the gap control mode is started, the arithmetic processing unit 12a is selected by the switch 15 shown in FIG. 1 at step 104, so that the gap control rate v is controlled by the normal arithmetic operation.

Figure 3:
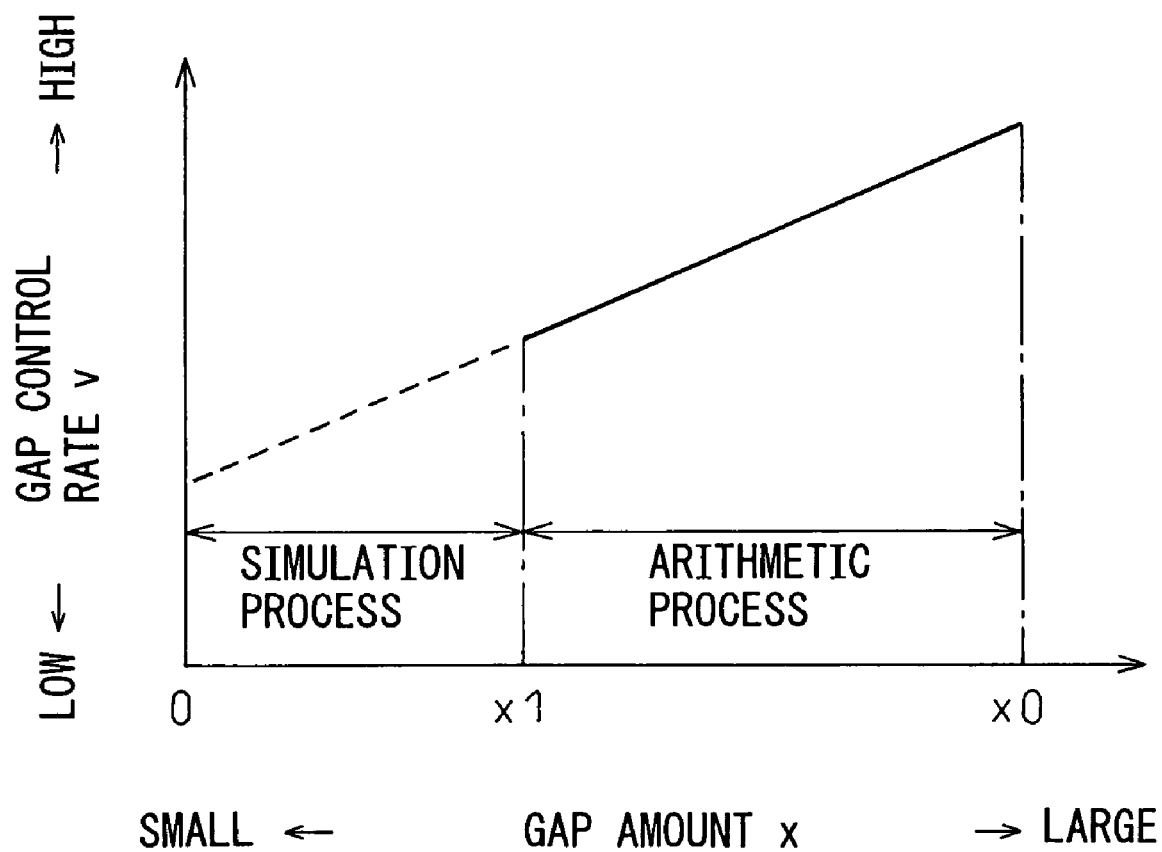
FIG. 3 is a diagram showing the relation between the gap amount x and the gap control rate v.

FIG. 3 is a diagram showing the relation between the gap amount x and the gap control rate v. In FIG. 3, the ordinate represents the gap control rate v, and the abscissa the gap amount x. In can be seen from FIG. 3, the larger the gap amount x, the higher the gap control rate v, and the smaller the gap amount x, i.e. the nearer the nozzle 42 approaches the workpiece W, the lower the gap control rate v. The arithmetic processing unit 12a of this invention calculates the gap control rate v in such a manner that the linear relation shown in FIG. 3 can be obtained based on the gap amount x detected at step 103 in the case where the gap amount x is larger than the piercing gap amount x1 (and smaller than the initial gap amount x0).

Next, at step 105, it is determined whether the present gap amount x detected by the gap sensor 43 is smaller than or equal to the piercing gap amount x1 with which to start the piercing process. In the case where it is determined that the gap amount x is smaller than or equal to the piercing gap amount x1, the process proceeds to step 106. In the case where it is determined that the gap amount x is not smaller than or not equal to the piercing gap amount x1, on the other hand, the process returns to step 103, and the process is repeated until the gap amount x becomes smaller or equal to the piercing gap amount x1.

Once the gap amount x becomes smaller than or equal to the piercing gap amount x1, the laser from the laser oscillator 31 is output from the tip 42a of the nozzle 42 at step 106, whereby the piercing process for the workpiece W is started. Further, at the time the piercing process is started, the switch 15 is turned to the simulation processing unit 12b at step 107, and the gap control rate v is calculated by simulation.

The simulation process of the simulation processing unit 12b is explained. First, the gap amount x immediately before switching from the arithmetic processing unit 12a to the simulation processing unit 12b, i.e. the piercing gap amount x1 and the gap control rate v1 thereof are stored.

Then, a half value (0.5×v1) of the gap control rate v1 is regarded as the average rate vm until the nozzle 42 reaches the surface of the workpiece W. Further, the gap amount x detected by the gap sensor 43 at the time of switching from the arithmetic processing unit 12a to the simulation processing unit 12b, i.e. the piercing gap amount x1 is regarded as the distance covered by the nozzle 42 to reach the surface of the workpiece W.

Under these conditions, the simulation processing unit 12b calculates the time t (=x1/vm) required for the nozzle 42 to reach the surface of the workpiece W using the aforementioned average rate vm and the covered distance x1. The gap amount x is calculated in such a manner that the gap amount x when switching from the arithmetic processing unit 12a to the simulation processing unit 12b becomes zero at constant rate at time t, and based on the gap amount x thus calculated, the gap control rate v is calculated. Specifically, after switching from the arithmetic processing unit 12a to the simulation processing unit 12b, the actual gap amount x detected by the gap sensor 43 is not used, but the gap amount x and the gap control rate v are calculated by simulation using the simulation processing unit 12b.

As described above, with the approach of the nozzle 42 to the surface of the workpiece W, the operation of the gap sensor 43 becomes unstable due to the plasma s, so that the gap control operation becomes unstable. According to this invention, however, switching operation is executed from the arithmetic processing unit 12a to the simulation processing unit 12b when the gap amount x is smaller than or equal to the covered distance x1. After using the simulation processing unit 12b, the actual gap amount x from the gap sensor 43 is not used. As a result, according to the invention, even in the case where the operation of the gap sensor 43 becomes unstable due to the plasma, the gap control rate v of the nozzle 42 can be calculated without the effect of the plasma, thereby making it possible to execute the piercing process in a stable fashion.

At the time of simulating the gap amount x and the gap control rate v in the simulation processing unit 12b, the simulated value may be appropriately assigned a weight using a predetermined signal or a set value. In such a case, as shown in FIG. 1, an adjuster 12c connected to the simulation processing unit 12b is used appropriately. The use of the adjuster 12c makes it possible to calculate the gap amount x and the gap control rate v more appropriately by simulation.

Referring again to FIG. 2, at step 108 of the program 100, it is determined whether the piercing process against the workpiece W is complete or not. In the case where it is determined that the piercing process is completed, the process proceeds to step 111. At step 111, switch 15 switches from the simulation processing unit 12b to the arithmetic processing unit 12a, thereby making it possible to calculate the gap control rate v through the arithmetic process.

In the case where it is determined that the piercing process for the workpiece W has yet to be completed, on the other hand, the process proceeds to step 109, and the simulation processing unit 12b simulates the gap amount x. Then, at step 110, it is determined whether the simulated gap amount x is smaller than or equal to the reference value x2 or not. The reference value x2 is smaller than the covered distance x1, and indicates the completion of the approach of the nozzle 42 to the workpiece W.

In the case where it is determined that the gap amount x is smaller than or equal to the reference value x2 at step 110, the process proceeds to step 111 and returns to the normal arithmetic operation. In the case where it is determined that the gap amount x is not smaller than or not equal to the reference value x2, on the other hand, the process is terminated. In the case where it is determined that the gap amount x is not smaller than or not equal to the reference value x2 at step 110, the process returns again to step 109, and this process may be repeated until the gap amount x is smaller than or equal to the reference value x2. Further, according to the invention, though not shown in FIG. 2, the cutting process may be appropriately executed after completion of the piercing process.

As explained above with reference to FIG. 2, according to this invention, the piercing process is started before completion of the approach of the nozzle 42. Specifically, unlike in the prior art, it is not required to wait for the completion of the nozzle 42 approach. According to this invention, therefore, the machining time is shorter as compared with the prior art. Further, according to the invention, unlike in the prior art, the gap control operation is not temporarily canceled. Specifically, according to the invention, time is not required to cancel the gap control process temporarily and therefore the machining time can be shortened more.

Although the invention has been shown and described with exemplary embodiments thereof, it should be understood by those skilled in the art that the foregoing and various other changes, omissions and additions may be made therein and thereto without departing from the spirit and the scope of the invention.

The invention claimed is:

1. A laser-machining device, for machining a workpiece by radiating the workpiece with the laser beam output from the nozzle of a laser oscillator, comprising:
   a gap amount sensor for detecting the gap amount between the workpiece and the nozzle; and
   an approaching means for causing the nozzle to approach toward the workpiece to a position suitable for laser machining;
   wherein the approaching means performs a first approach operation in which the nozzle approaches the workpiece using the gap amount detected by the gap amount sensor until the gap amount reaches a predetermined value, and a second approach operation in which, after the first approach operation, the nozzle approaches the workpiece until the completion of the approach without using the gap amount detected by the gap amount sensor;
   the laser beam is radiated on the workpiece while starting the second approach operation.

2. A laser-machining device according to claim 1 wherein, in the first approach operation, an approach rate of the nozzle is calculated based on the gap amount detected by the gap amount sensor and, wherein, in the second approach operation, the approach rate of the nozzle is calculated by simulating the gap amount on the assumption that the predetermined value is equal to the gap amount between the workpiece and the nozzle immediately before the end of the first approach operation and that the average value of the approach rate of the nozzle is equal to half the value of the approach rate immediately before the end of the first approach operation.

3. A laser-machining device according to claim 2, further comprising an adjusting means for adjusting the approach rate by assigning a weight to the simulated gap amount using a signal or a set value.

* * * * *